US010565268B2

(12) United States Patent
Winnemoeller et al.

(10) Patent No.: US 10,565,268 B2
(45) Date of Patent: Feb. 18, 2020

(54) INTERACTIVE COMMUNICATION AUGMENTED WITH CONTEXTUAL INFORMATION

(71) Applicant: Adobe Inc., San Jose, CA (US)

(72) Inventors: Holger Winnemoeller, Seattle, WA (US); Daniela Cecilia Steinsapir Stitchkin, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 1201 days.

(21) Appl. No.: 14/133,806

(22) Filed: Dec. 19, 2013

(65) Prior Publication Data

US 2015/0178388 A1    Jun. 25, 2015

(51) Int. Cl.
| | |
|---|---|
| *G06F 16/951* | (2019.01) |
| *G06Q 50/00* | (2012.01) |
| *G06Q 10/10* | (2012.01) |
| *H04L 12/18* | (2006.01) |
| *H04L 12/58* | (2006.01) |

(52) U.S. Cl.
CPC .......... *G06F 16/951* (2019.01); *G06Q 10/10* (2013.01); *G06Q 50/01* (2013.01); *H04L 12/1827* (2013.01); *H04L 51/02* (2013.01); *H04L 51/10* (2013.01)

(58) Field of Classification Search
CPC . G06F 17/30864; G06F 16/951; G06Q 50/01; G06Q 10/10; H04L 51/02
USPC ........................................................ 707/722
See application file for complete search history.

(56) References Cited

U.S. PATENT DOCUMENTS

| | | | | |
|---|---|---|---|---|
| 8,224,815 B2* | 7/2012 | Davidson | .............. | G06F 17/276 |
| | | | | 707/723 |
| 9,299,061 B2* | 3/2016 | Scherpa | .............. | G06Q 10/101 |
| 9,501,802 B2* | 11/2016 | van der Flier | ........ | G06F 3/0481 |
| 9,602,559 B1* | 3/2017 | Barros | .................. | H04L 65/403 |
| 2007/0271340 A1* | 11/2007 | Goodman | ............ | G06Q 10/107 |
| | | | | 709/206 |
| 2008/0235018 A1* | 9/2008 | Eggen | ..................... | G10L 15/26 |
| | | | | 704/251 |
| 2009/0177484 A1* | 7/2009 | Davis | ..................... | G06Q 30/02 |
| | | | | 705/346 |
| 2009/0307082 A1* | 12/2009 | Raghunathan | ......... | G06Q 30/02 |
| | | | | 705/14.44 |
| 2010/0246784 A1* | 9/2010 | Frazier | ................ | H04L 65/1083 |
| | | | | 379/88.13 |

(Continued)

*Primary Examiner* — Cam Y T Truong
(74) *Attorney, Agent, or Firm* — Finch & Maloney PLLC

(57) ABSTRACT

Techniques are disclosed for augmenting an interactive communication session with contextually relevant information. A computing device, such as a smartphone or tablet computer, can be configured to provide an augmented chat application configured to create, send, receive and display a conversation, and further configured to locate, retrieve and display, via a graphical user interface (GUI), other information that is contextually relevant to the conversation. The contextual information may be shared with one or more other users who are participating in the conversation either automatically or in response to a user input. The contextual information can be displayed or otherwise presented to the user explicitly (e.g., the actual content of the contextual information can be displayed via the GUI) or implicitly (e.g., a referent to the contextual information, such as a hyperlink or other cue, can be displayed via the GUI).

13 Claims, 11 Drawing Sheets

(56) References Cited

U.S. PATENT DOCUMENTS

| | | | |
|---|---|---|---|
| 2011/0246920 A1* | 10/2011 | Lebrun | G06Q 30/02 |
| | | | 715/769 |
| 2012/0239761 A1* | 9/2012 | Linner | G06F 17/2765 |
| | | | 709/206 |
| 2012/0254745 A1* | 10/2012 | SanGiovanni | G06F 3/0485 |
| | | | 715/702 |
| 2014/0136990 A1* | 5/2014 | Gonnen | H04L 51/18 |
| | | | 715/752 |
| 2014/0317502 A1* | 10/2014 | Brown | G06F 9/453 |
| | | | 715/706 |

* cited by examiner

INTERACTIVE COMMUNICATION AUGMENTED WITH CONTEXTUAL INFORMATION

FIELD OF THE DISCLOSURE

This disclosure relates to the field of data processing, and more particularly, to techniques for augmenting an interactive communication session with contextually relevant information.

BACKGROUND

Interactive electronic communication includes dynamic flows of information between multiple participants, typically over the Internet or other types of electronic communication networks. Such communication can be manifested in any number of ways, including text messaging, image and video sharing, and various forms of social media. For example, online chatting is a popular mode of interactive communication using electronic devices, such as personal computers and smart phones, for exchanging relatively short, text-based messages among two or more users in a style that resembles a natural, spoken conversation of varying subject matter.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
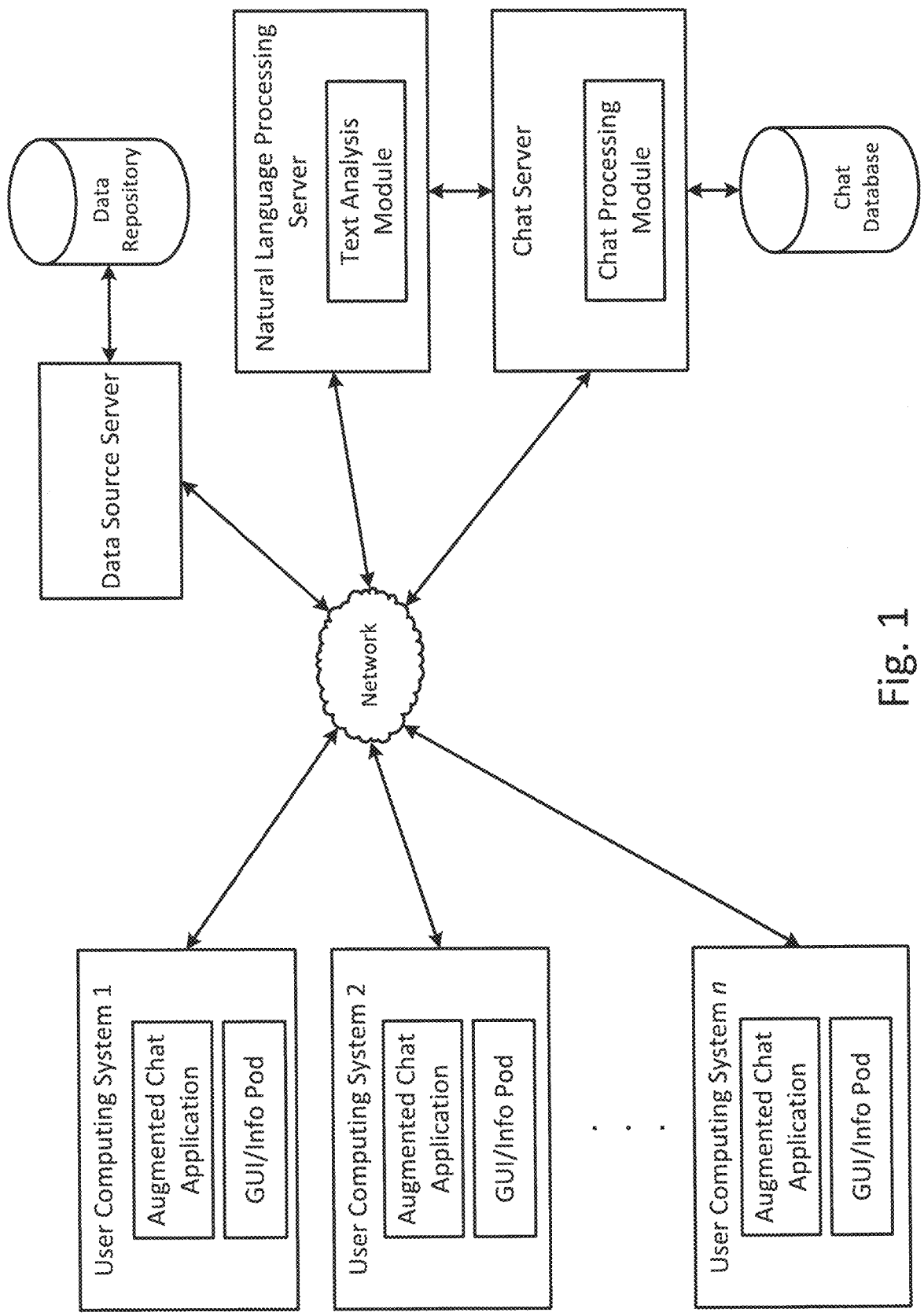
FIG. 1 illustrates an example client-server computing system configured in accordance with an embodiment of the present invention.

As mentioned above, text chatting, which in some forms is commonly referred to as instant messaging (IM), is a popular mode of conversation between two or more participants. However, as will be appreciated in light of this disclosure, present electronic communication solutions do not provide some of the visual and contextual affordances of actual visual or aural communication. For instance, references to past or current events, shared memories, and factual information that are relevant to the context of the conversation are not readily available. A user may not know or remember where to get additional information from, and may have to search a large number of sources before finding the relevant piece of information. Even if available, IM does not readily support insertion of rich media content including photos, videos or animations. Further exacerbating the situation is that any tracking down of information disrupts the communication flow, which is atypical of such communication mediums (i.e., chat is fast moving and concise from the user perspective).

To this end, and in accordance with an embodiment of the present invention, techniques are provided for augmenting an interactive communication session with contextually relevant information. In one specific embodiment, a computing device, such as a smartphone or tablet computer, is configured to provide an augmented chat application (ACA) configured to create, send, receive and display a conversation, and further configured to locate, retrieve and display, via a graphical user interface (GUI), other information that is contextually relevant to the conversation (also referred to herein as contextual information). The contextual information can, in some embodiments, be shared with one or more other users who are participating in the conversation either automatically or in response to a user input. The contextual information can be displayed or otherwise presented to the user explicitly (e.g., the actual content of the contextual information can be displayed via the GUI) or implicitly (e.g., a referent to the contextual information, such as a hyperlink or other cue, can be displayed via the GUI).

As used herein, the term "conversation," in addition to its plain and ordinary meaning, includes any kind of communication conducted via an electronic communication network, such as the Internet, that provides a real-time or near real-time transmission of data (e.g., data representing text, images, video and/or other information) from one user to one or more other users. In one example, a conversation may include one or more messages (e.g., SMS text messages, chat messages or other rapid messaging service) sent from one user to another. In another example, a conversation may include multiple messages received by one user from another. In yet another example, a conversation may include any combination of messages exchanged between two or more users. Other such examples will be apparent in light of this disclosure. The message may include, for example, text, graphics, hyperlinks, formatting commands, or any combination thereof.

As used herein, the term "conversation stream," in addition to its plain and ordinary meaning, includes a conversation, such as defined above, in which a series of messages are exchanged between two or more users. The messages in the series may, as non-limiting examples, be related in that they involve the participation of at least one common user or users having another relationship (e.g., friends on Facebook®), contain a common theme(s) or topic(s), occur over a certain period of time, or any combination thereof. Other attributes of the messages may serve to relate each message to the conversation stream, as will be apparent.

In some embodiments, the ACA provides a GUI in which a conversation is surrounded by one or more information pods in a common viewing area. The information pods display contextual information relevant to the conversation. In this manner, the user can interact with different contexts without switching between applications, since the contextual information appears in the same viewing space as the conversation. This enables the user to communicate with one or more other users in a natural and timely manner. In some embodiments, the ACA analyzes the text of the conversation for relevant keywords, topics, sentiment, or other meaning (e.g., anything that can be extracted automatically using natural language analysis, which may include keyword/term search techniques, content extraction techniques, or both), and uses that data to populate the information pods. The analysis may be performed by the ACA or another application or service. In some embodiments, each information pod can be configured to display information obtained from different sources, such as Flickr® images, CNN® news, Wikipedia® articles, Facebook® posts, Twitter® feeds, documents stored on a local hard drive or cloud storage, etc.

Given that the topics and keywords used in a conversation naturally evolve or change over the course of the conversation, the contents and sources for information pods can change dynamically over time as the conversation evolves or changes. The content of the information pods may change at a rate frequent enough so that the information remains substantially relevant to the context of the conversation, but not so frequently as to be a source of distraction to the user, since there may, for example, be a practical limit at which the user is able to read and comprehend the content before it changes. To this end, the user may configure the pod update frequency, in some embodiments. The information displayed in the information pods may be based on contextual cues in the conversation, such as keywords and phrases, as well as other indicia such as user profile, time, and historical information. In this manner, the information in the information pods is considered to augment the ongoing conversation. For example, if the conversation includes a reference to a recent news event (e.g., "Did you hear that the Packers won today?"), then a news outlet or aggregator site may be polled for information relevant to the news event, which may then be displayed in one of the information pods. Similarly, if a person's name is mentioned in the conversation, then one or more social media sites may be polled for relevant posts regarding that person or that person's avatar. Other examples will be apparent.

According to an embodiment, while a user who is engaged in a conversation is waiting for a response from another conversation partner, the user can browse the contents of the information pods. All or part of the content of the information pods can then be introduced into the conversation stream either implicitly (e.g., by making reference to the content in the conversation, such as introducing a picture from a fishing trip into the conversation in response to the user entering "Remember when we caught that huge sea bass?"), or explicitly in response to the user embedding (e.g. drag-and-drop, selecting for sharing, etc.) the content directly into the stream. Accordingly, this allows users to remain as much as possible within the context of the ongoing conversation, while enabling a rich peripheral display of relevant contextual information, with low-effort sharing capabilities.

System Architecture

FIG. 1 illustrates an example client-server computing system configured in accordance with an embodiment of the present invention. In this example, one or more user computing systems are each configured to interact electronically, via a communication network, with a natural language processing server, a chat server and one or more data source servers. The user computing system(s) include a graphical user interface (GUI), which may include one or more information pods as variously described herein, and an augmented chat application (ACA). The natural language processing server includes a text analysis module. The chat server includes a chat processing module. Although depicted in FIG. 1 as separate devices, it will be appreciated than in some embodiments the componentry or functionality of the user computing system, the natural language processing (NLP) server, the chat server, or any combination thereof, may be integrated in whole or in part. For example, the ACA may be implemented locally on the user computing system or remotely on the chat server. One or more chat databases operatively connected to the chat server can be configured to store messages in a conversation and/or other data generated or used within the client-server computing system, such as logs and other suitable metadata associated with the various conversations. The data source server can provide any electronic source of data, such as a website, file server or other suitable data provider, and is operatively coupled to one or more data repositories that can be used to store any type of data (e.g., news, videos, social media, encyclopedias, product catalogs, travel information, blogs, and so forth). The databases can be implemented, for example, with any suitable type of memory, such as a disk drive included in, or otherwise in communication with, the web server. Other suitable memories include flash memory, random access memory (RAM), a memory stick or thumb drive, USB drive, cloud storage service, etc. In a more general sense, any memory facility can be used to implement the databases.

As will be appreciated in light of this disclosure, the various modules and components of the system shown in FIG. 1, such as the GUI, augmented chat application, text analysis module and chat processing module, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, the server, and databases, as described herein, can be performed by similar processors and/or databases in different configurations and arrangements, and that the depicted embodiments are not intended to be limiting. Various components of this example embodiment, including the user computing systems and/or server, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. The network can be any communications network, such as a user's local area network and/or the Internet, or any other public and/or private communication network (e.g., local and/or wide area network of a company, etc.). The GUI can be implemented using any number of known or proprietary browsers or comparable technology that facilitates retrieving, presenting, and traversing information resources, such as web pages on a website, via a network, such as the Internet.

The ACA can be implemented in a number of different ways. For example, the ACA may be served to the user computing system by the chat server as a webpage, or the ACA may be a dedicated application running on the user computing system. The ACA can be configured to accept text input from the user and feed text input to the NLP server.

The NLP server may be a module (e.g., integrated within) the ACA, or a server on the same machine, or a remote server. The text analysis module of the NLP server can be configured to analyze text entered by the user(s) of the user computing systems. In doing so, the text analysis module may consider any and all available information from the conversation or other sources. That is, the text analysis module can use the most recent IM message entered, but can also refer to the chat server for logs of previous messages. In general, the text analysis module may produce an ontology relating to a particular person (e.g., one of the users or another person having an online identity), or the individuals participating in the conversation. For example, the text analysis module may be configured to learn that one of the users likes chatting about particular topics (such as cars, or sports), where the user lives and works, who the user's friends are, etc. The text analysis module may learn, for instance, that the name "Jonny" refers to a particular friend that is in common with two or more conversation partners, that those users have talked about seeing a certain movie together, etc. Thus, the ontology can learn from past conversations to learn about the meaning of certain keywords in the context of the people involved in the conversation. The ontology can then serve as a basis for disambiguating keywords and topics that arise in future messages between the conversation partners. Given this approach, the text analysis module can recognize keywords, subjects, nouns, verbs, topics, or other relevant content, and feed this data to the ACA for further processing.

The chat processing module of the chat server can act as an intermediary between two or more ACA instances, allowing those instances to interact with each other asynchronously. As discussed above, the chat processing module can be a conceptual module that may, for example, be integrated into an application (e.g., the ACA) or implemented as a remote service. The chat processing module can be configured to accept IM messages entered via the GUIs of the various user computing systems and forward those messages to other users who are participating in the same conversation. In some embodiments, the chat processing module can be configured to maintain a log of the conversation, which can be referenced by the users or other services, such as the text analysis module.

Example Computing Device

Figure 2:
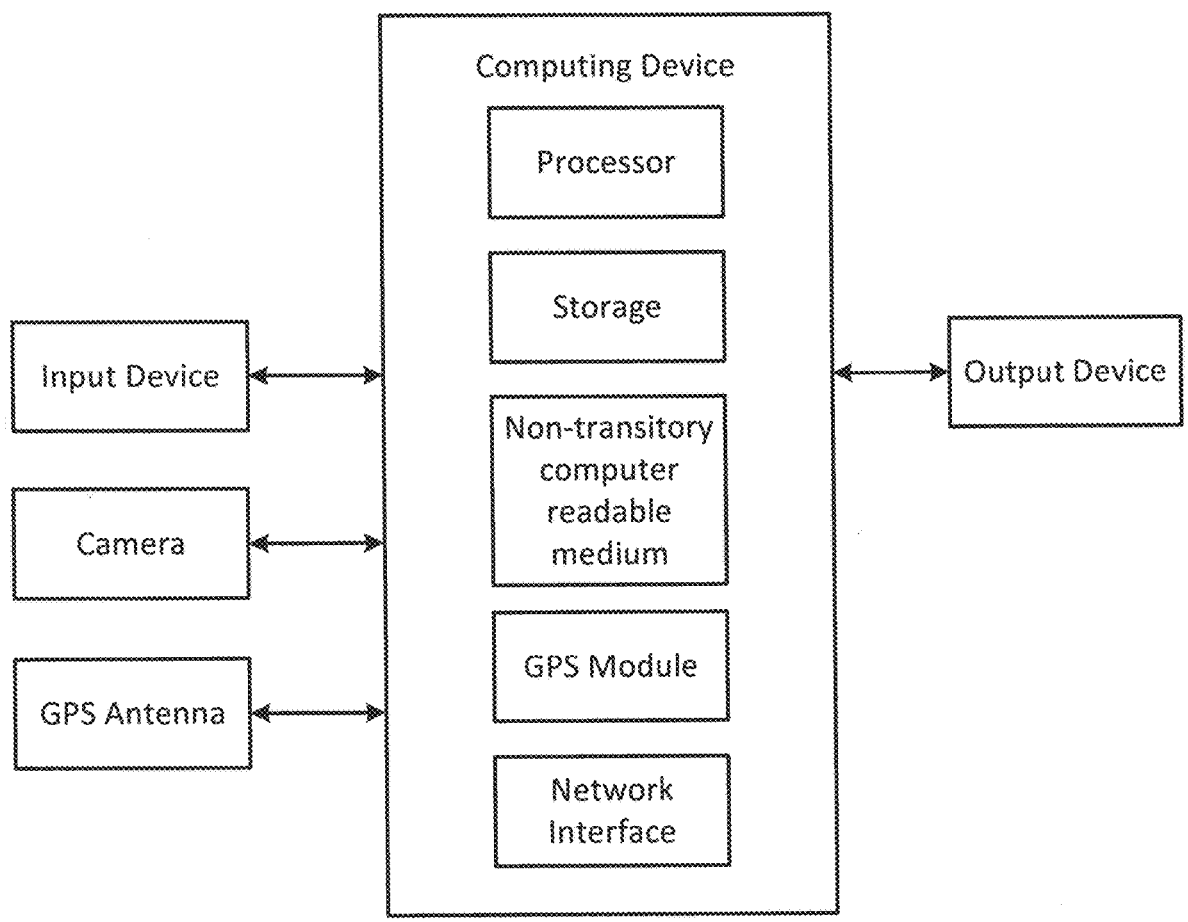
FIG. 2 is a block diagram representing an example computing device that can be used in conjunction with an embodiment of the present invention.

FIG. 2 is a block diagram representing an example computing device that may be used to perform any of the techniques as variously described herein. The computing device may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device includes one or more storage devices and/or non-transitory computer-readable media having encoded thereon one or more computer-executable instructions or software for implementing techniques as variously described herein. The storage devices may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device may include other types of memory as well, or combinations thereof. The storage device may be provided on the computing device or provided separately or remotely from the computing device. The non-transitory computer-readable media may include, but are not limited to, one or more types of hardware memory, non-transitory tangible media (for example, one or more magnetic storage disks, one or more optical disks, one or more USB flash drives), and the like. The non-transitory computer-readable media included in the computing device may store computer-readable and computer-executable instructions or software for implementing various embodiments. The computer-readable media may be provided on the computing device or provided separately or remotely from the computing device.

The computing device also includes at least one processor for executing computer-readable and computer-executable instructions or software stored in the storage device and/or non-transitory computer-readable media and other programs for controlling system hardware. Virtualization may be employed in the computing device so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device through an output device, such as a screen or monitor, which may display one or more user interfaces provided in accordance with some embodiments. The output device may also display other aspects, elements and/or information or data associated with some embodiments. The computing device may include other I/O devices for receiving input from a user, for example, a keyboard or any suitable multi-point touch interface, a pointing device (e.g., a mouse, a user's finger interfacing directly with a display device, etc.). The computing device may include other suitable conventional I/O peripherals. The computing device can include and/or be operatively coupled to various devices such as a camera, GPS antenna, and/or other suitable devices for performing one or more of the functions as variously described herein. The computing device can include a GPS module configured to receive a signal from the GPS antenna and to determine a geographical location based on the signal.

The computing device may include a network interface configured to interface with one or more networks, for example, a Local Area Network (LAN), a Wide Area Network (WAN) or the Internet, through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface may include a built-in network adapter, network interface card, PCMCIA network card, card bus network adapter, wireless network adapter, USB network adapter, modem or any other device suitable for interfacing the computing device to any type of network capable of communication and performing the operations described herein. The network device may include one or more suitable devices for receiving and transmitting communications over the network including, but not limited to, one or more receivers, one or more transmitters, one or more transceivers, one or more antennas, and the like.

The computing device may run any operating system, such as any of the versions of the Microsoft® Windows® operating systems, the different releases of the Unix and Linux operating systems, any version of MacOS® for Macintosh computers, any version of iOS® for Apple mobile devices, any version of Android for Android-compatible mobile devices, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example User Interfaces

Figure 3:
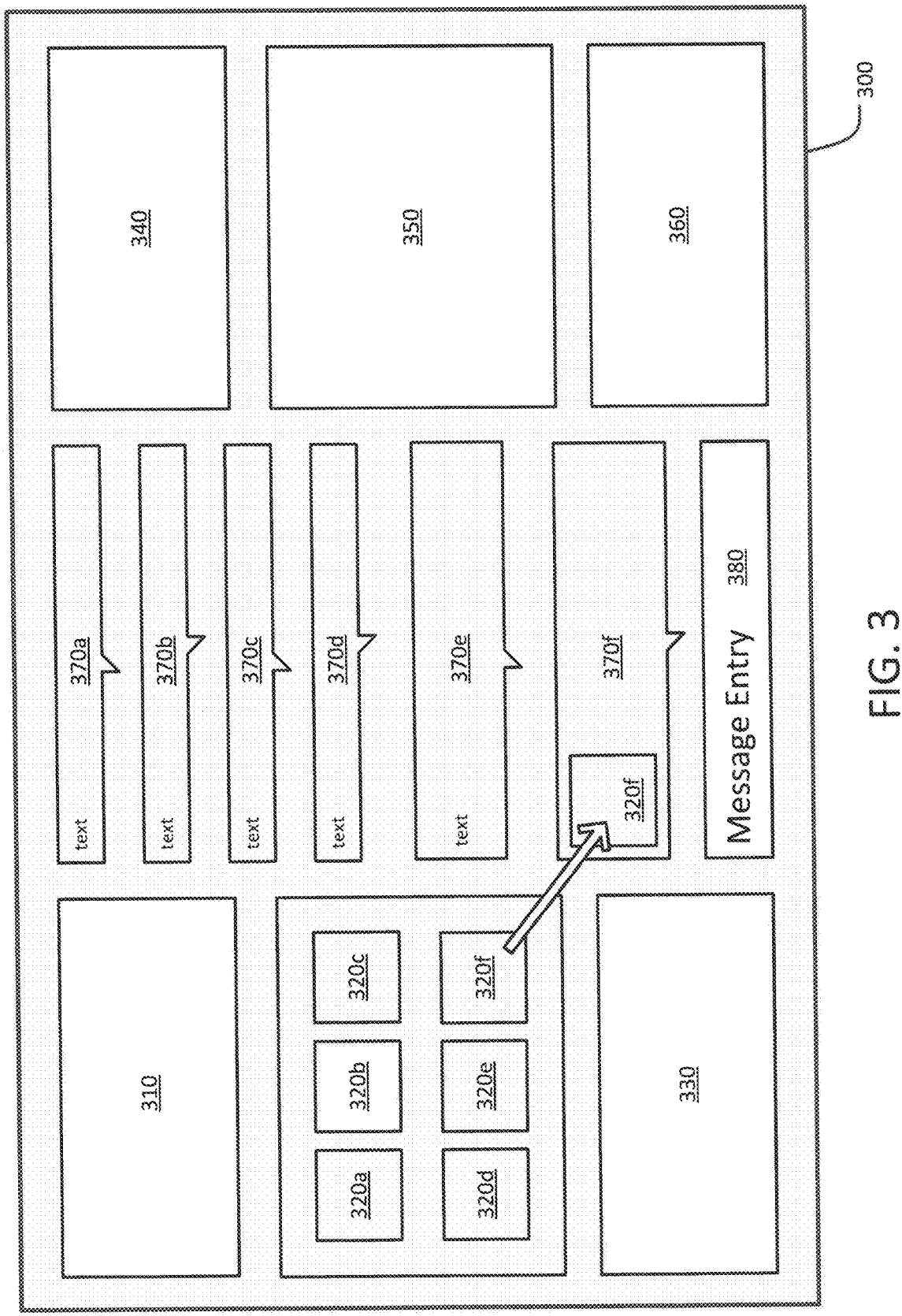
FIG. 3 illustrates an example user interface for augmenting an interactive communication session with contextually relevant information, in accordance with an embodiment of the present invention.

FIG. 3 illustrates an example user interface 300 for interactive communication augmented with contextual information, in accordance with an embodiment. The interface 300 may, for example, be implemented on any computing device having a suitable display (both touch-sensitive and non-touch-sensitive), such as a personal computer, laptop computer, tablet device, multi-purpose handheld computer or smartphone. The interface 300 includes multiple regions 310-380 that are concurrently visible to a user. It will be understood that the number, size, shape, content and relative locations of each region may be varied according to a particular application, as will be apparent in view of this disclosure. The example interfaces described herein are intended to be non-limiting. Some or all of regions (e.g., regions 310, 320a-f, 330, 340, 350 and 360) may be referred to as information pods or output fields. Each information pod can contain a different source of information. Examples of information sources include people (e.g., users), websites, file servers, databases or data stores. Examples of the types of information available in each information pod include text, photographs, videos, maps, audio and other types of electronic media. Other regions (e.g., regions 370a-f) may be used to display all or a portion of a conversation between multiple users. Yet other regions (e.g., region 380) may be used as input fields for enabling a user to enter text or other message data, which may be included in the conversation. For instance, as new messages enter the conversation (whether entered by the user of the interface 300 or another user), the messages in regions 370a-370f may scroll up or down the screen as appropriate so that the newest messages are displayed in the interface 300 and the oldest messages are removed as necessary to make space for the remaining messages. In some embodiments, information displayed in one of the information pods can be inserted into the conversation by, for example, dragging the corresponding information pod into one of the conversation regions (e.g., regions 370a-f and 380), such as shown by the arrow associated with region 320f. In some embodiments, information displayed in one of the information pods can be inserted into the conversation by, for example, copying all or part of any content that is contextually relevant to the conversation. Contextual relevancy may be determined, for instance, by identifying associations between text in the conversation and the content or any metadata associated with the content. For example, if a user enters a text reference to "Joe's birthday party," any photos appearing in one of the information pods (e.g., 320a-f) that are tagged as "Joe" and "birthday" or "party" may automatically be inserted into the conversation based on the text reference.

In accordance with some embodiments, the layout of the interface 300 can facilitate one-to-one or one-to-many user communications. Such communications can include multimedia content and expression of personal state using emoticons (e.g., pictorial representations of facial expressions depicting the tenor or temper of the communication, usually by the means of textual punctuation marks or other graphics). Further, the interface 300 can provide, within each information pod (e.g., information pods 310, 320a-f, 330, 340, 350, and 360), information that is relevant to the conversation. The user may specify the type of content displayed in the various information pods. Such a layout may simplify the flow of the conversation, allowing for creating shared experiences and serendipitous exploration within the context of the conversation.

In one embodiment, one or more information pods can be configured to display information about people, images, videos, avatars (e.g., graphical representations of a user or a user's alter ego, such as used in video games and social media), maps, graphics and other content that is relevant to one or more of the users involved in the conversation. Such information can change dynamically depending on the context of the conversation, the users involved in the conversation, or both. The content can be sourced from a variety of sources, such as Facebook®, Flickr®, Vimeo®, YouTube®, Google+®, Wikipedia®, eBay®, Amazon.com®, news agencies, or other personal and social media repositories. In some embodiments, the interface 300 may be partitioned such that information pods on one side of the interface display content that is only viewable by the user of the interface (e.g., private content), and information pods on the opposite side of the interface display content that is viewable by one or more other users involved in the conversation (e.g., public or shared content). In some embodiments, a region of the interface 300 (e.g., one or more information pods) may be magnified such that a larger portion of the interface 300 is used to display the information in the magnified region. Such magnification may include enlarging the visibility of the content in the magnified region, displaying additional content within the expanded area of the magnified region, or both.

In one embodiment, if a user enters a new IM message into the ACA, or the ACA receives a remote message from the chat server, the NLP server is invoked to analyze the text using natural language analysis techniques. The natural language analysis techniques may, for example, identify certain words (e.g., keywords) used in the message to generate a search query. Furthermore, the message may be analyzed to identify semantic meanings of keywords to create more targeted queries. For example, the word cake refers to food, so information sources relating to cooking, groceries, or restaurants may be queried specifically. Additional language analysis may yield data on the emotional context of a message, e.g., it may detect words expressing happiness, desire, interest, or excitement. The search query can then be sent to one or more of the information pods (IP).

Each IP can be associated with one or more sources of information, which is used to populate the content of the IP. These sources may include, for example, website APIs or other networked information resources, or local resources (e.g., files stored in a file system local to the respective user computing system, images stored in a local image repository, or video stored in a local video repository). Some non-limiting examples of such IP sources include Google® search, Flickr® keyword search, and Facebook® Social Graph API requests. Other IP sources will be apparent. The IP can be configured to query the corresponding source using, for example, the relevant search query constructed from the results of the analysis performed by the NLP server, and receive a response from the source. The response can then be formatted appropriately and displayed in the corresponding region of the GUI by the ACA. Both the source query mechanism and the formatting of resulting information can be configurable per IP, or per query response type (e.g., Facebook® post, Facebook® event, Facebook® profile). This may be done, for example, in a manner similar to web information cards that show various biographical information of a person or company and other information related to the subject of the information. The content and level of detail displayed in each IP can be configured to fit within the available screen real estate or region of the GUI assigned to the IP.

In some embodiments, users can choose to "pin" certain IPs, which cause those IPs to be always visible. Other IPs can changed (e.g., to display information from a different source) depending on the context of the current conversation. For example, a photo-streaming IP may be swapped out for another IP that is configured to display Wikipedia articles if the conversation shifts from a discussion of a specific dance event to a discussion about the origins of flamenco. In some embodiments, users may customize the type or source of information displayed in a particular IP. New pod sources and designs can readily be shared with other users. Some IPs may also reference multiple data sources, such as a source for locating the cheapest flights across several airlines, when the discussion is about travel. In some embodiments, IPs can appear in static regions of the GUI, or the IPs can dynamically appear and disappear in the GUI. Alternatively, given that the contextual information is related to a certain passage in the text, the pods can be visually linked with the text (e.g., via graphics, such as arrows or associations, such as common coloring).

Referring again to FIG. 3, the conversation stream (e.g., regions 370a-f) may be arranged vertically within the interface 300. New messages may enter at the bottom (e.g., region 370f) and exit through the top (e.g., region 370a) of the interface 300. The IPs may be arranged in an accompanying space next to the conversation flow (e.g., regions 340, 350 and 360) and scroll up within the interface 300 in sync with the flow of the conversation (e.g., as regions 370a-f scroll upward, the regions 340, 350 and 360 also scroll upward). This particular design facilitates replay of past conversations or portions of the conversation which have scrolled out of the interface 300 by enabling the user to scroll to earlier points in the conversation, along with the IPs associated with each of those points.

According to some embodiments, information displayed in the IPs can be used to influence the future direction of a conversation by inspiring the user with its content. In some cases, the user can actively embed information displayed in an IP into the conversation stream, for example, by dragging the graphical representation of the information from the IP (e.g., region 340f) to the conversation stream (e.g., region 370f). In some embodiments, the formatting of an information bit (3200 may have different forms depending on whether it is shown in the IP or within the text stream (370a-f). In some cases, the ACA can learn from user interaction with the content of the IPs, for example, by identifying which subjects the user prefers based on the amount of interaction the user has with a particular IP.

In some embodiments, IPs can display information symmetrically such that one or more other users participating in the conversation see the same information, or asymmetrically such that the information in the IP is visible only to one user. The latter may occur if, for example, both participants choose different types of IP, or when privacy restrictions prevent information private to one user from being displayed to other users. In such cases, information may be shared explicitly by manually entering the information into the conversation. In some cases, the IPs can be configured such that the IPs do not distract the user from the ongoing conversation. For instance, updates to the information in the IPs may be scheduled to occur at finite or minimum intervals of time, the transitions may be smoothly rendered, the formatting may blend into the background, or any combination of these characteristics. In some embodiments, an ACA can be configured to visualize hyperlinks embedded within the text of the conversation stream. For instance, an IP may be configured to visually indicate why it is displaying certain information or how the information is related to the content of the conversation stream by use of a hyperlink. In one example, an IP may be color coded to relevant keywords highlighted in the conversation that were used as the basis of the information displayed in the IP. In a similar manner, users may explicitly select or highlight certain keywords or phrases using the ACA, if the NLP server didn't detect these automatically. For example, the user may highlight words or phrases with the mouse or via the touch screen, and then prompt the system to query on these terms. Alternatively, the user may drag these terms onto a specific pod to set a query source associated with the terms. Alternatively, the user may use textual markup (such as # hashtags) to mark up relevant keywords. These latter techniques make it possible to use the ACA without any automated natural language processing or other interpretation or parsing of the message. However, the text analysis module frees the user from having to proactively select terms in the conversation if the user chooses not to do so.

Figure 4:
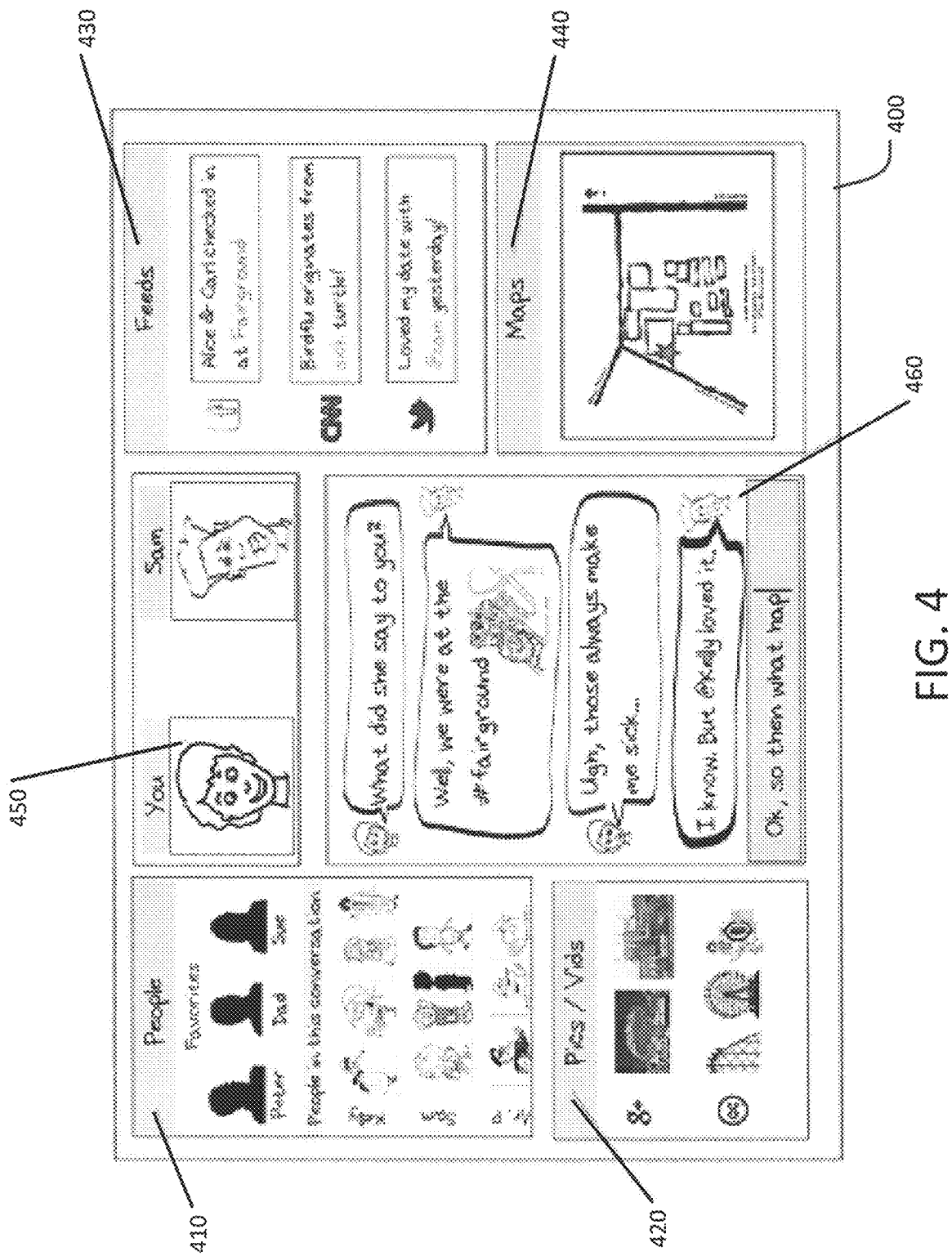
FIG. 4 illustrates another example user interface for augmenting an interactive communication session with contextually relevant information, in accordance with an embodiment of the present invention.

FIG. 4 illustrates another example user interface 400 for interactive communication augmented with contextual information, in accordance with an embodiment. The interface 400 may, for example, be implemented on any computing device having a suitable display (both touch-sensitive and non-touch-sensitive), such as a personal computer, laptop computer, tablet device, multi-purpose handheld computer or smartphone. The interface 400 includes multiple regions 410-460 that are concurrently visible to a user. It will be understood that the number, size, shape, content and relative locations of each region may be varied according to a particular application, as will be apparent in view of this disclosure. Some regions of the interface 400 (e.g., regions 410, 420, 430 and 440) may be referred to as information pods or output fields. As discussed above, each information pod can contain a different source of information, such as people, images and videos, content retrieved from news or social media sources, maps, or any other type of text or multimedia content that is relevant to the context of the conversation or otherwise selected by the user. Some other regions of the interface 400 (e.g., region 450) may include information relating to the participants of a conversation, such as names and avatars or photos of each participant. Such avatars or photos may, in some cases, be used to express the emotional state of the respective user based on the context of the conversation. For example, the expression of the avatar may include a smile if the emotional state is happy or a frown if the emotional state is sad. Such avatars or photos may, in other cases, be based on other contextual information, such as the physical location of the user, the time of day, or whether the user is at home, at work or on vacation. The information relating to the participants may be different for different groups of participants (e.g., family, friends, co-workers, or classmates). Yet other regions of the interface 400 (e.g., region 460) may include a conversation stream, such as the messages being entered and exchanged among the participants.

The functionality of the client-server system of FIG. 1 may be extended in a multitude of ways. In some embodiments, the conversation may include two or more participants, and the features discussed above apply similarly regardless of the number of participants. In one embodiment, the ACA can provide domain-specific IPs. For example, visual designers can use an ACA to augment and facilitate their collaborative design process. In this case, the IP sources can be files on the user's computer (e.g., if tagged appropriately, or if computer vision techniques apply), or other sources relevant to designers (such as Kuler, Behance, Flickr, 500px, etc.) In some embodiments, an ACA can be configured to provide advertisements that are relevant to the context of the conversation. For example, if users chat about a trip they are planning together, the system may provide an IP configured to suggest a mode of travel (e.g., plane, train, car rental), an accommodation (e.g., hotel), dining options (e.g., restaurants), or any combination thereof, along with reviews and pricing information. If users chat about buying new running shoes, the system can suggest nearby shoe stores and display a map or driving directions to the stores based on the user's current location (e.g., as determined using a Global Positioning System (GPS) detector integrated into the user computing device). Other examples will be apparent. In contrast to standard techniques, an ACA can be more sensitive as to when to display ad-like information based on the context of the conversation. For example, when talking about a shared past experience, the system may display relevant pictures and no ads. However, if the conversation is about current or new smartphones, cars, trips, or other subjects, then information can be provided in an IP to advertise relevant products in a seamless and unobtrusive manner within the GUI. This can promote user acceptance and encourage interaction with such ads.

Example Methodologies

Figure 5:
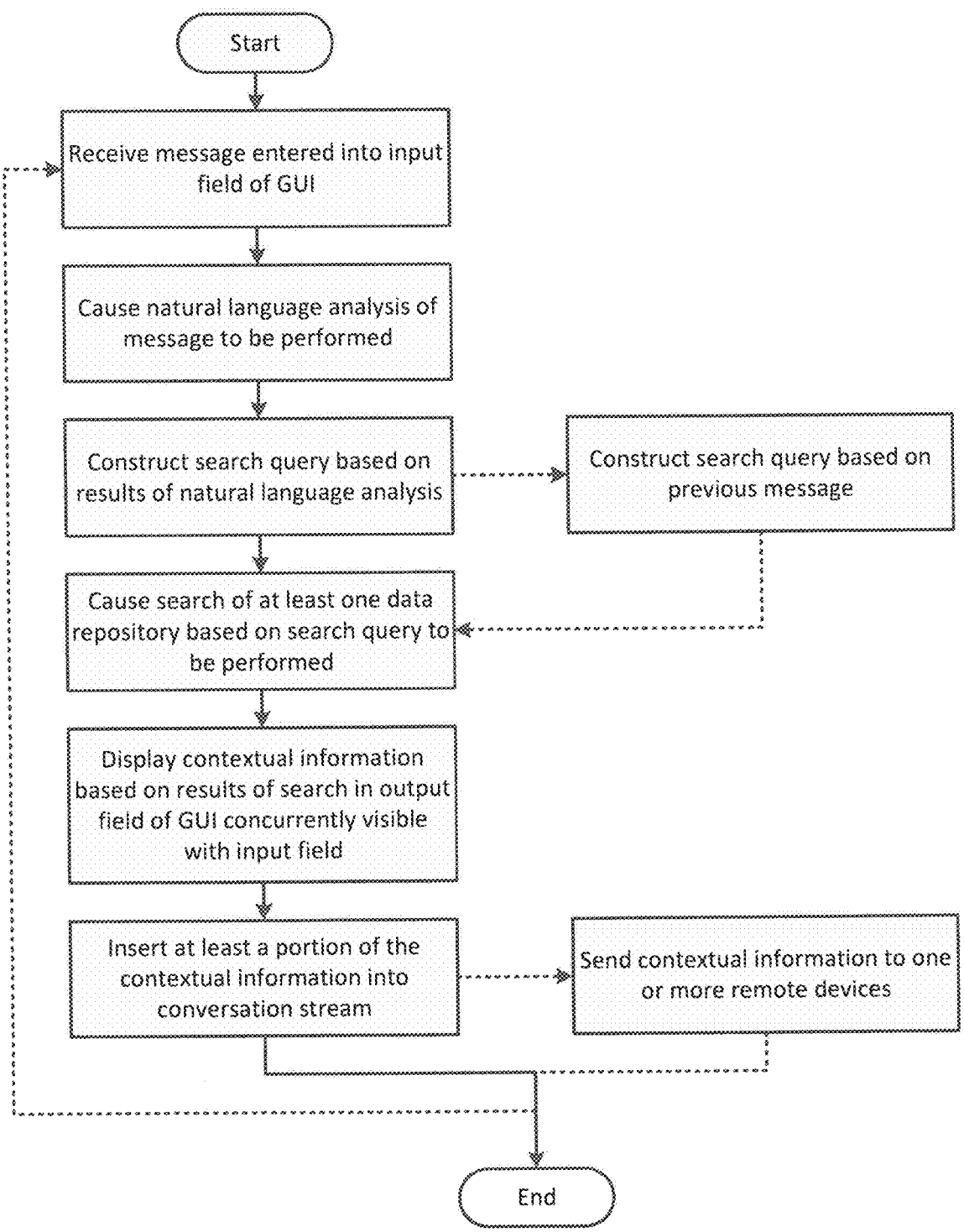
FIG. 5 illustrates an example methodology for augmenting an interactive communication session with contextually relevant information, in accordance with an embodiment of the present invention.

FIG. 5 illustrates an overview of an example methodology for augmenting an interactive communication session with contextually relevant information, in accordance with an embodiment. The method begins by receiving a message entered into an input field of a graphical user interface, such as the interface 300 of FIG. 3. The message form a portion of a conversation stream in which a series of messages are exchanged among a plurality of users. For instance, the message may initiate a new conversation stream or form a response to another message in an existing conversation stream. The message may be received, for example, by the augmented chat application on one of the user computing systems of FIG. 1. The method continues by causing performance of an analysis (e.g., a natural language analysis or other suitable interpretation or parsing) of the message. The analysis of the message may be performed, for example, by the text analysis module of the natural language processing server of FIG. 1 in response to receiving the message. Once the analysis of the message has been performed, a set of results may be returned to the augmented chat application from the text analysis module.

The method continues by constructing a search query based on results of the message analysis. The search query may, for example, be constructed such that it includes at least one search term related to the conversation stream. Other search queries may be constructed that potentially yield results that are relevant to a context of the conversation. For example, the search query may be based, at least in part, on one or more prior messages in the conversation stream, or other user activities such as social media posts, taking photos with a mobile device, dialing telephone numbers, and so forth. Once a search query has been constructed, the method continues by causing performance of a search of at least one data repository based on the search query. The search may be performed, for example, on one or more data repositories associated with the data source server of FIG. 1. In some embodiments, a standard search engine, such as Google® or Bing®, may be used. In other embodiments, domain-specific search engines may be used, if the semantic meaning of keywords can be detected. For example, a message about a flight to Chicago may be routed to Kayak.com™, Expedia™, or other similar service. The search results in contextual information that can be displayed or rendered in an output field of the graphical user interface. The output field can be visible concurrently with the input field, for instance, in different portions of the GUI (e.g., side-by-side). In some embodiments, the method includes inserting at least a portion of the contextual information into the conversation stream, sending the contextual information to one or more remote devices (e.g., the devices of other participants of the conversation stream), or both. The inserting may be performed in response to receiving the results of the search or receiving a user input that selects the displayed contextual information (e.g., click or drag-and-drop actions within the GUI). The method may repeat indefinitely.

Example Screenshots

Figure 6:
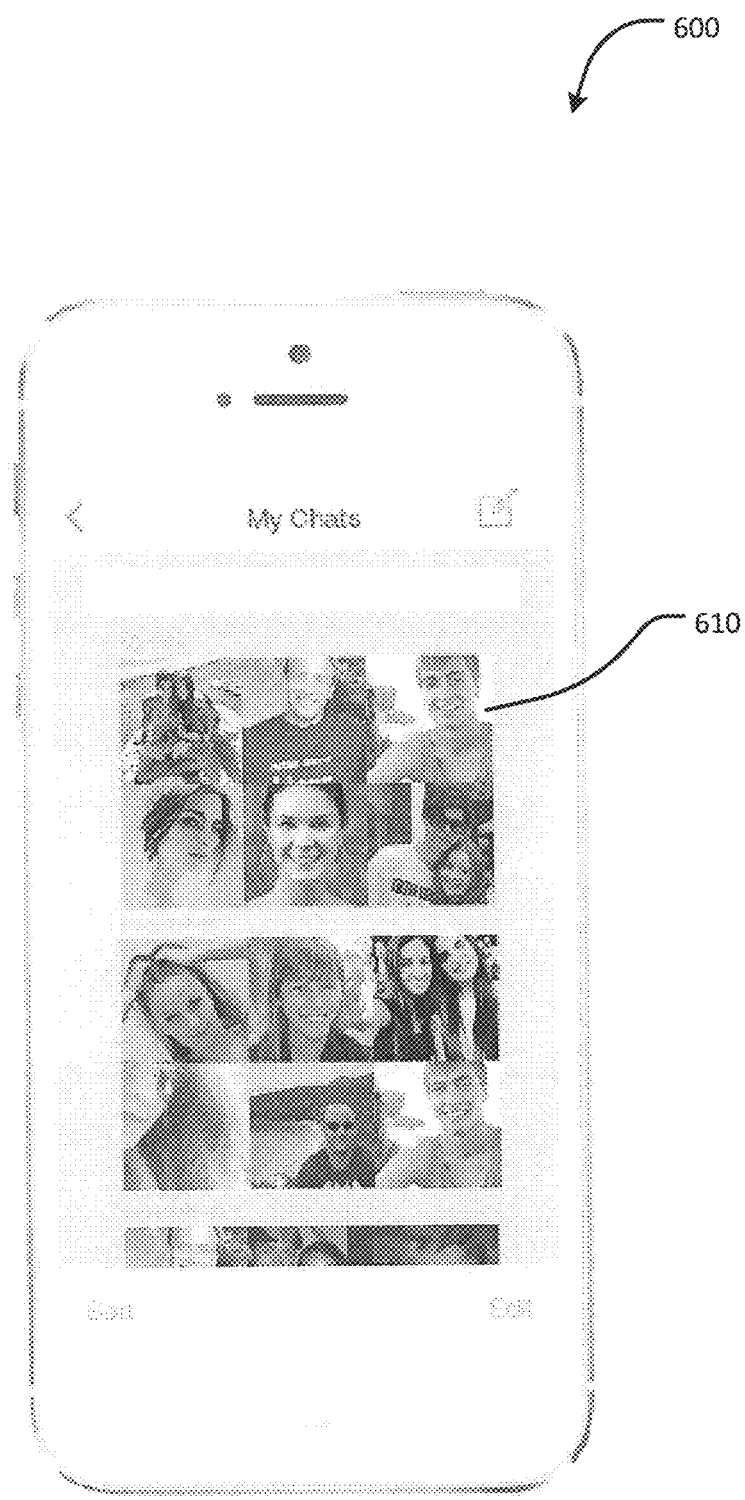
FIGS. 6-11 illustrate several example screenshots of a user computing device configured in accordance with various embodiments of the present invention.

FIG. 6 is an example screenshot 600 of a user computing device configured in accordance with an embodiment. The screenshot 600 is configured to display one or more conversation threads, each being represented by an image 610 (e.g., the user's profile photo) or other graphical icon. A conversation thread may be selected, for example, by tapping the corresponding photo 610 on the screen. The conversation threads can be sorted in any manner, such as by time, topic, participant(s), or emotion.

Figure 7:
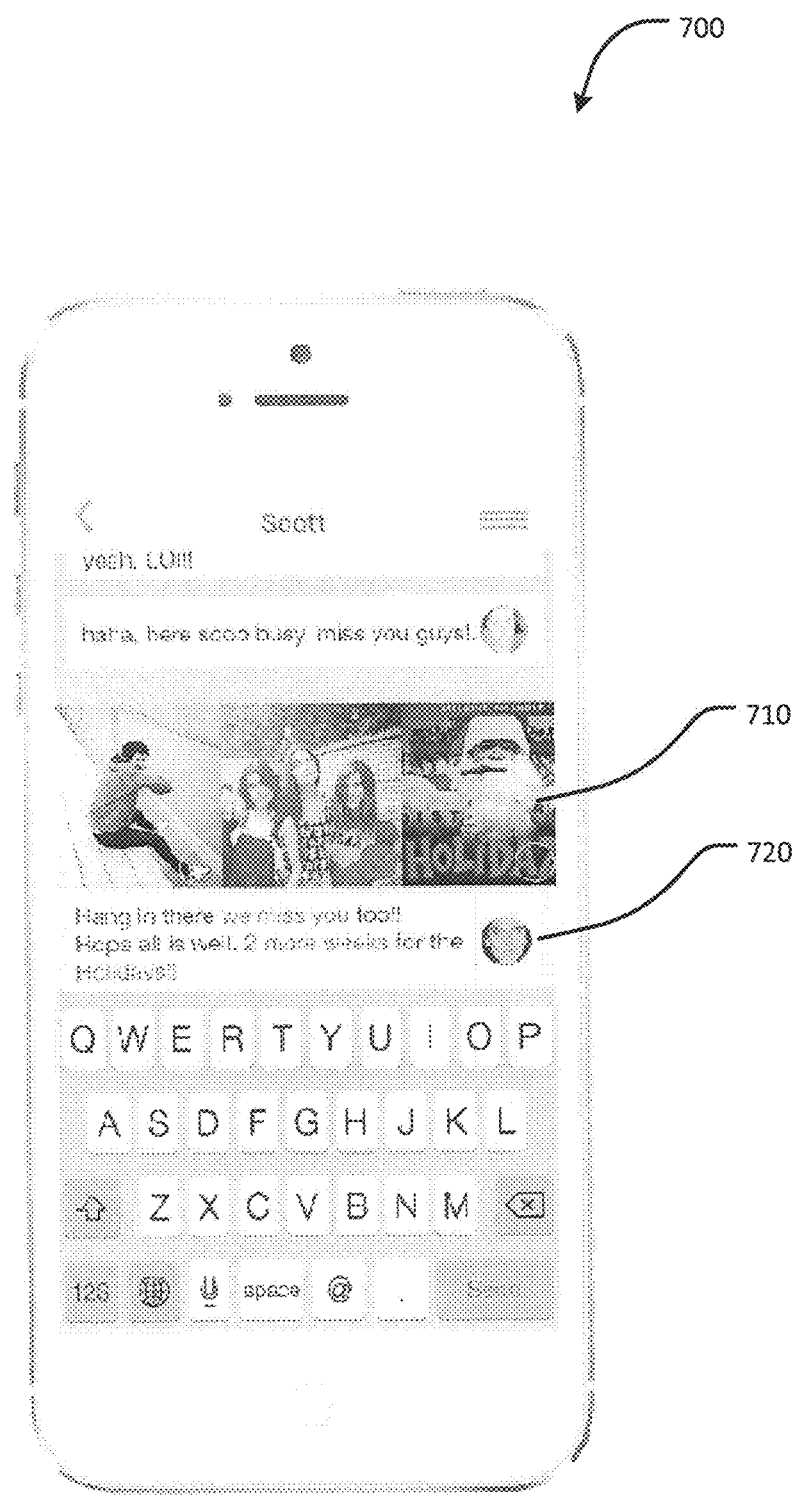

FIG. 7 is an example screenshot 700 of a user computing device configured in accordance with an embodiment. The screenshot 700 is configured to display one or more media content suggestions. The suggestions may, for example, be represented by graphical icons 710 or other representational indicia, such as text links. Before sending a message, the suggestions may be presented to the user within, for example, a scrollable bar. A personalized emoticon 720 representing the user's emotional state may be displayed. The user may select one of the icons 710 to include the corresponding suggestion into the conversation stream, if desired.

Figure 8:
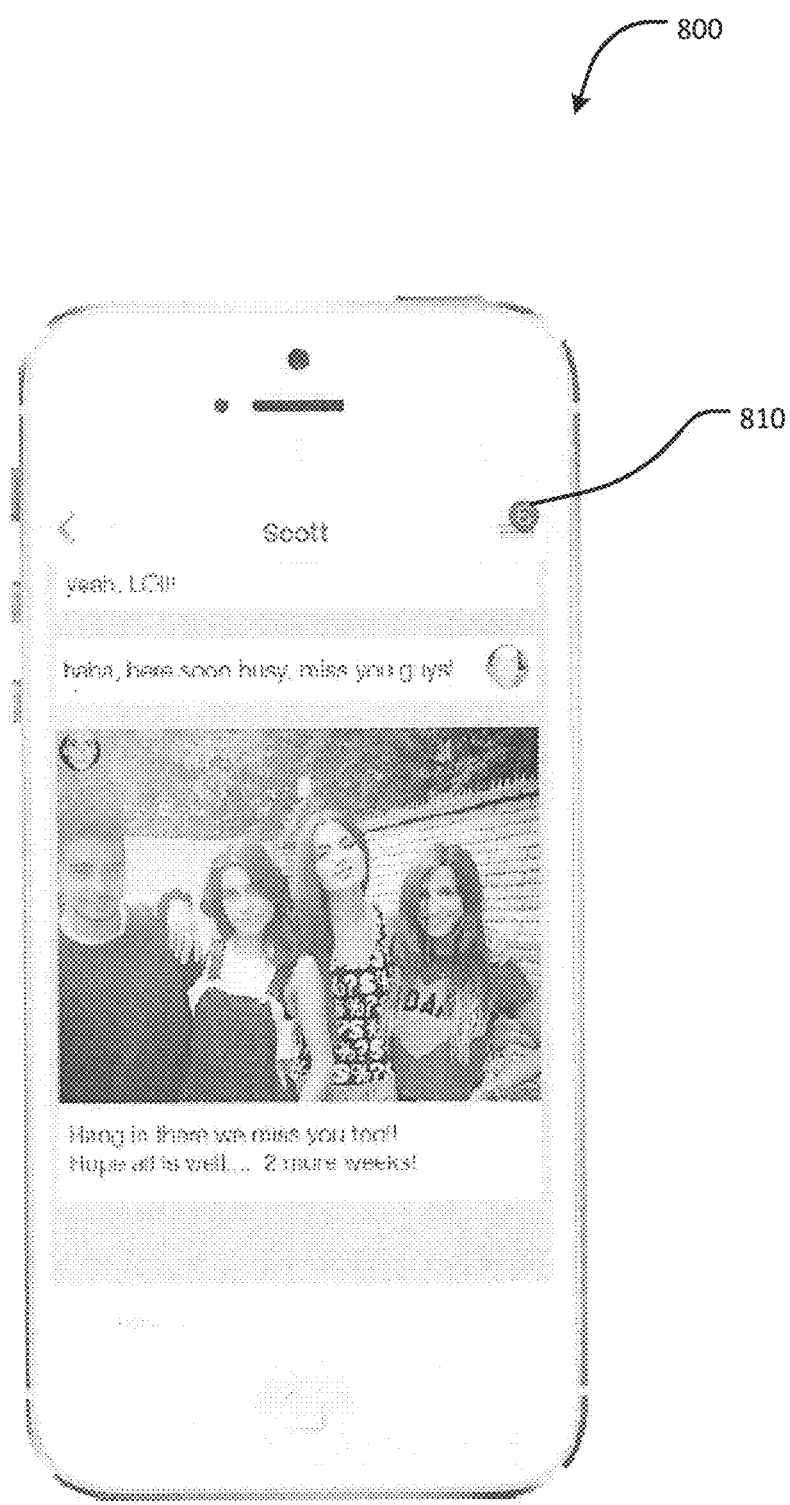

FIG. 8 is an example screenshot 800 of a user computing device configured in accordance with an embodiment. The screenshot 800 is configured to display an icon 810 that indicates one or more notifications are pending. Notifications may be used, for example, to let the user know that one or more media content suggestions relevant to the conversation have been located using the techniques variously described herein. The icon 810 may include a number representing the number of new (e.g., unread or unacknowledged) suggestions.

Figure 9:
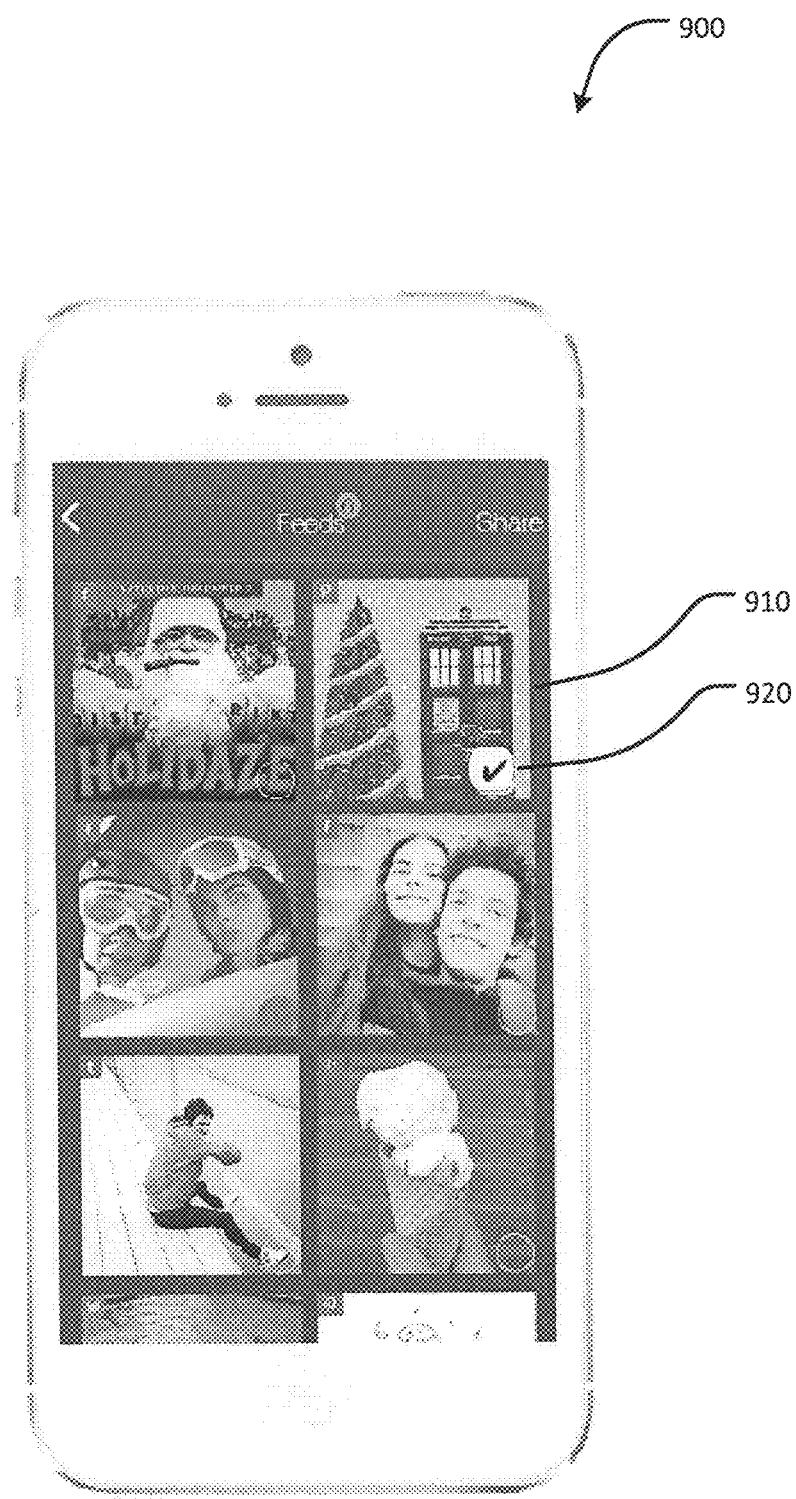

FIG. 9 is an example screenshot 900 of a user computing device configured in accordance with an embodiment. The screenshot 900 is configured to display one or more media content assets that are relevant to the participants and topics of a conversation stream. Each asset can be represented by an image 910 or other graphical icon. The assets may be found, for example, in the social media associated with any of the conversation participants. The images 910 are scrollable and selectable. Selected suggestions can be inserted into the conversation by tapping a checkmark in the image 910. The images 910 may be enlarged by tapping on the image.

Figure 10:
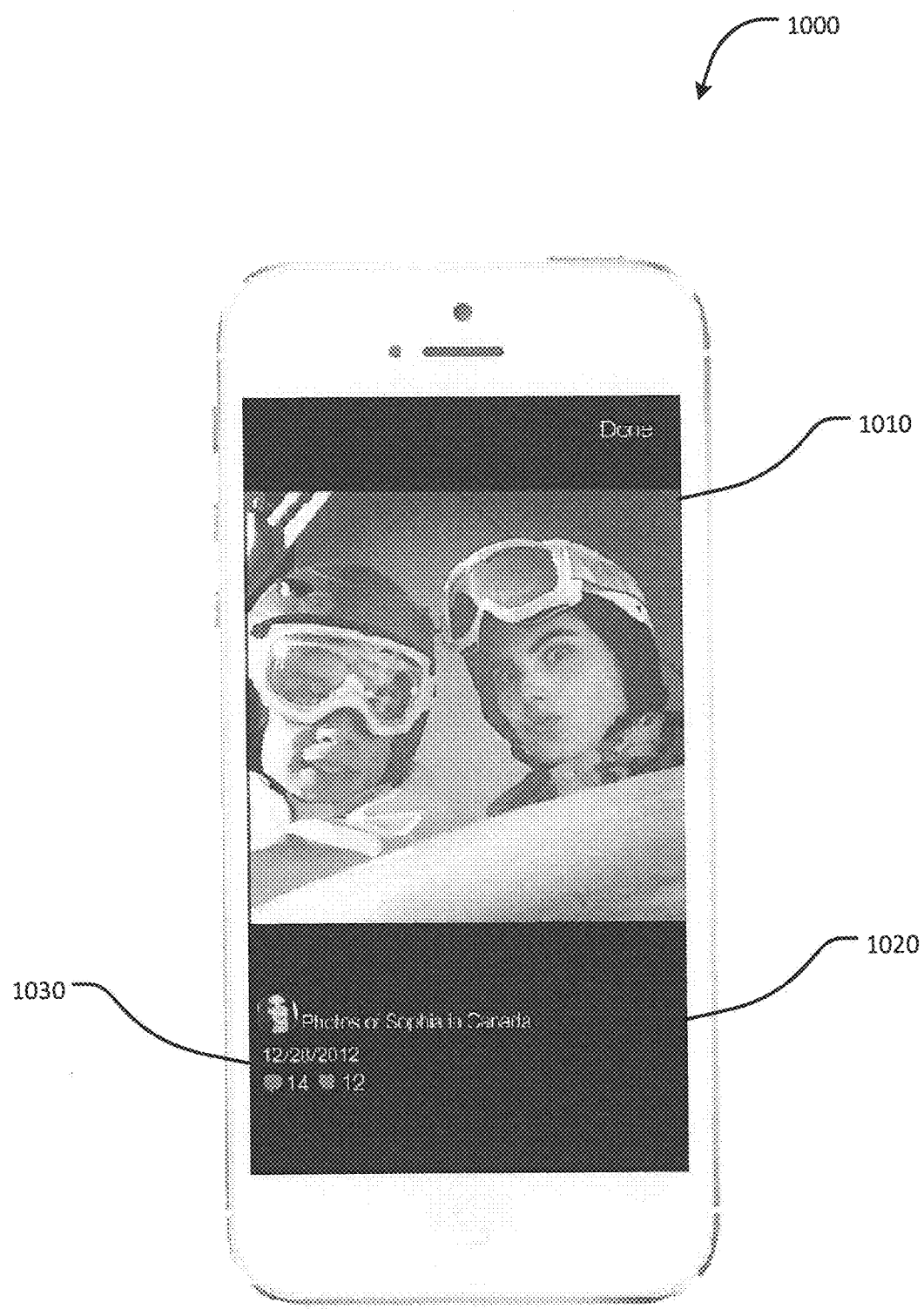

FIG. 10 is an example screenshot 1000 of a user computing device configured in accordance with an embodiment. The screenshot 1000 is configured to display various types of content, such as photos 1010, messages 1020 and likes 1030 (e.g., indicators of how many users have "liked" the content) at different levels of magnification. In this example, the photo 1010 is magnified for fill the width of the display.

Figure 11:
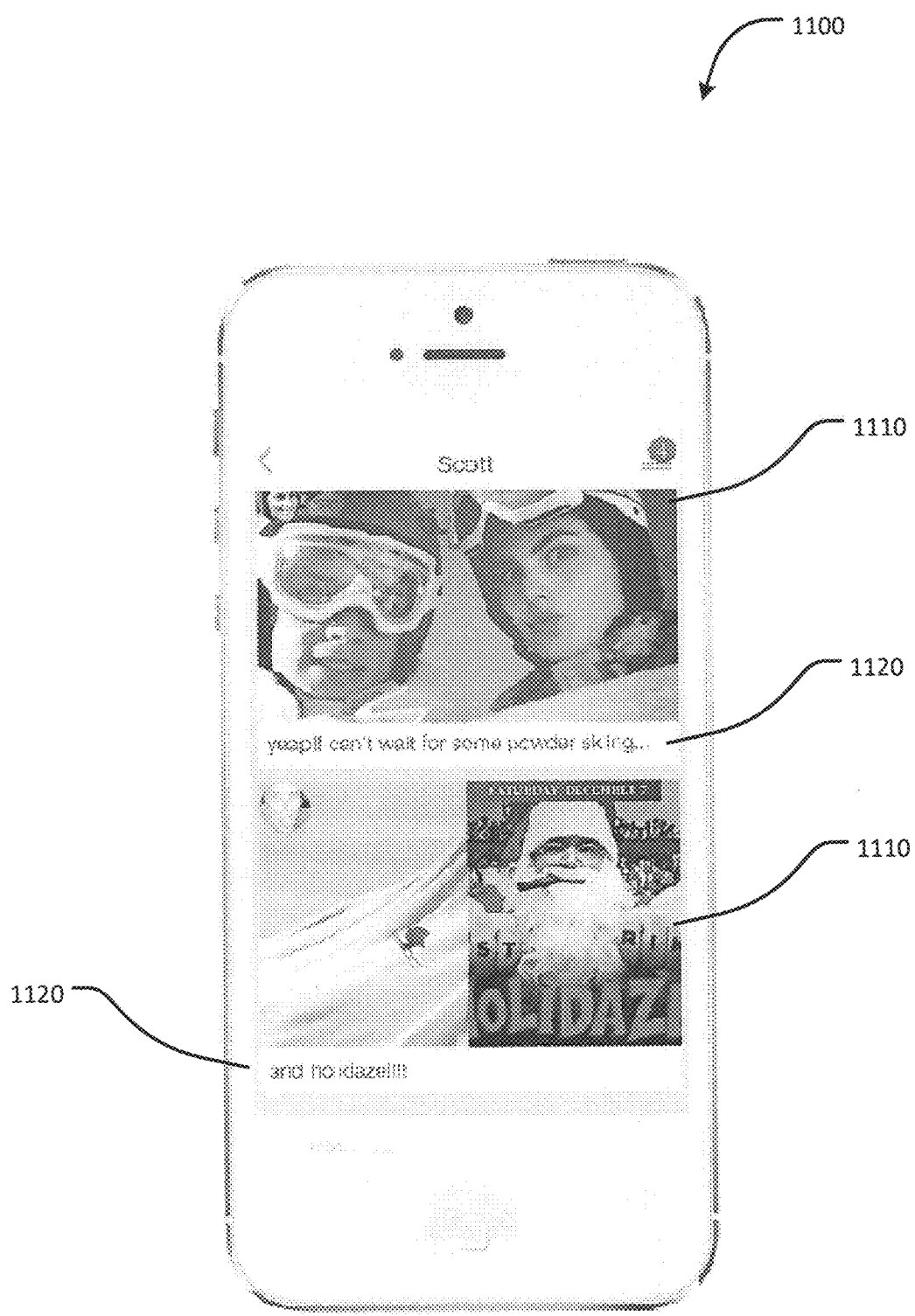

FIG. 11 is an example screenshot 1100 of a user computing device configured in accordance with an embodiment. The screenshot 1100 is configured to display media content suggestions that have been added into a conversation thread. For example, the suggestions may be represented by images 1110 or other graphical icons that are embedded with messages 1120 forming a portion of the conversation stream.

Numerous embodiments will be apparent in light of the present disclosure, and features described herein can be combined in any number of configurations. One example embodiment of the invention provides a computer-implemented method. The method includes receiving a message entered into an input field of a graphical user interface, the message forming a portion of a conversation stream in which a series of messages are exchanged among a plurality of users; causing performance of an analysis of the message; constructing a search query based on results of the analysis; causing performance of a search of at least one data repository based on the search query; and displaying contextual information based on results of the search in an output field of the graphical user interface, the output field being visible concurrently with the input field. In some cases, the search query is constructed such that it includes at least one search term related to the conversation stream. In some cases, the method includes constructing the search query based at least in part on a previous message in the conversation stream. In some cases, the method includes inserting at least a portion of the contextual information into the conversation stream. In some such cases, the inserting is performed in response to receiving the results of the search. In some other such cases, the inserting is performed in response to receiving a user input that selects the displayed contextual information. In some cases, the method includes rendering each of the input field and output field in different portions of the graphical user interface. In some cases, the method includes sending the contextual information to one or more remote devices each having a respective graphical user interface. In some cases, some or all of the functions variously described in this paragraph can be performed in any order and at any time by one or more different processors.

Another example embodiment provides a system including a storage having a display, a storage having at least one memory, and one or more processors each operatively coupled to the storage. The one or more processors are configured to carry out a process including receiving a message entered into an input field of a graphical user interface, the message forming a portion of a conversation stream in which a series of messages are exchanged among a plurality of users; causing performance of an analysis of the message; constructing a search query based on results of the analysis; causing performance of a search of at least one data repository based on the search query; and displaying, on the display, contextual information based on results of the search in an output field of the graphical user interface, the output field being visible concurrently with the input field. In some cases, the search query is constructed such that it includes at least one search term related to the conversation stream. In some cases, the process includes constructing the search query based at least in part on a previous message in the conversation stream. In some cases, the process includes inserting at least a portion of the contextual information into the conversation stream. In some such cases, the inserting is performed in response to receiving the results of the search. In some other such cases, the inserting is performed in response to receiving a user input that selects the displayed contextual information. In some cases, the process includes rendering each of the input field and output field in different portions of the graphical user interface. In some cases, the process includes sending the contextual information to one or more remote devices each having a respective graphical user interface. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A computer-implemented method comprising:
   receiving, by at least one processor, a message entered into an input field of a graphical user interface (GUI) by a first user, the message forming a portion of a conversation stream in which a series of messages are exchanged among a plurality of users;
   causing display, by the at least one processor, of the entered message in a first output field of the GUI;
   causing, by the at least one processor, automatic construction of a search query based on at least one previous message in the conversation stream;
   causing, by the at least one processor, performance of a search of at least one data repository based on the message, wherein the performance of the search is further based on the search query, and wherein the search query is constructed so that it includes at least one search term related to the conversation stream;
   causing display, by the at least one processor, of contextual information based on results of the search in a second output field of the GUI, the second output field being displayed in a separate region of the GUI next to the first output field, the contextual information in the second output field configured to scroll within the GUI in sync with the entered message as the first output field scrolls within the GUI prior to a user selection of the contextual information; and
   selectively sending, by the at least one processor, the contextual information displayed in the second output field to a remote device of a second user in response to receiving, from the first user, the user selection of the contextual information displayed in the second output field.

2. The method of claim 1, further comprising rendering the first output field and the second output field in different portions of the graphical user interface.

3. The method of claim 1, further comprising sending at least a portion of the contextual information to one or more remote devices, each remote device having a respective graphical user interface.

4. The method of claim 1, further comprising inserting, by the at least one processor, at least a portion of the contextual information into the conversation stream so that the inserted at least a portion of contextual information is displayed in both of the first output field and the second output field.

5. The method of claim 4, wherein the inserting is performed automatically in response to receiving the results of the search.

6. The method of claim 4, wherein the inserting is performed in response to receiving the input from the first user that selects the contextual information displayed in the second output field.

7. A computing device, comprising:
a display;
a storage comprising at least one memory; and
one or more processors operatively coupled to the storage and the display, the one or more processors configured to carry out a process that causes the one or more processors to:
receive a message entered into an input field of a graphical user interface (GUI) by a first user, the message forming a portion of a conversation stream in which a series of messages are exchanged among a plurality of users;
cause display of the entered message in a first output field of the GUI;
automatically construct a search query based on at least one previous message in the conversation stream;
cause performance of a search of at least one data repository based on the message, wherein the performance of the search is further based on the search query, and wherein the search query is constructed so that it includes at least one search term related to the conversation stream;
cause display of contextual information based on results of the search in a second output field of the GUI, the second output field to be displayed in a separate region of the GUI next to the first output field, the contextual information in the second output field configured to scroll within the GUI in sync with the entered message as the first output field scrolls within the GUI prior to a user selection of the contextual information; and
selectively sending the contextual information displayed in the second output field to a remote device of a second user in response to receiving, from the first user, the user selection of the contextual information displayed in the second output field.

8. The computing device of claim 7, wherein the process further causes the one or more processors to insert at least a portion of the contextual information into the conversation stream so that the inserted at least a portion of contextual information is displayed in both of the first output field and the second output field, and wherein the inserting is performed automatically in response to receiving the results of the search.

9. The computing device of claim 8, wherein the inserting is performed in response to receiving the input from the first user that selects the contextual information displayed in the second output field.

10. The computing device of claim 7, wherein the process further causes the one or more processors to render the first output field and the second output field in different portions of the graphical user interface.

11. The computing device of claim 7, wherein the process further causes the one or more processors to send at least a portion of the contextual information to one or more remote devices, each remote device having a respective graphical user interface.

12. A non-transitory computer-readable medium having instructions encoded thereon that when executed by one or more processors cause a process to be carried out, the process comprising:
receiving a message entered into an input field of a graphical user interface (GUI) by a first user, the message forming a portion of a conversation stream in which a series of messages are exchanged among a plurality of users;
causing display of the entered message in a first output field of the (GUI);
causing automatic construction of a search query based on at least one previous message in the conversation stream;
causing performance of a search of at least one data repository based on the message, wherein the performance of the search is further based on the search query, and wherein the search query is constructed so that it includes at least one search term related to the conversation stream;
causing display of contextual information based on results of the search in a second output field of the GUI, the second output field being displayed in a separate region of the GUI next to the first output field, the contextual information in the second output field configured to scroll within the GUI in sync with the entered message as the first output field scrolls within the GUI prior to a user selection of the contextual information; and
selectively sending the contextual information displayed in the second output field to a remote device of a second user in response to receiving an input from the first user that selects the contextual information displayed in the second output field.

13. The non-transitory computer-readable medium of claim 12, wherein the process further comprises inserting at least a portion of the contextual information into the conversation stream so that the inserted at least a portion of contextual information is displayed in both of the first output field and the second output field, and wherein the inserting is performed in response to at least one of receiving the results of the search and receiving the input from the first user that selects the contextual information displayed in the second output field.

* * * * *